United States Patent Office 3,469,432
Patented Sept. 30, 1969

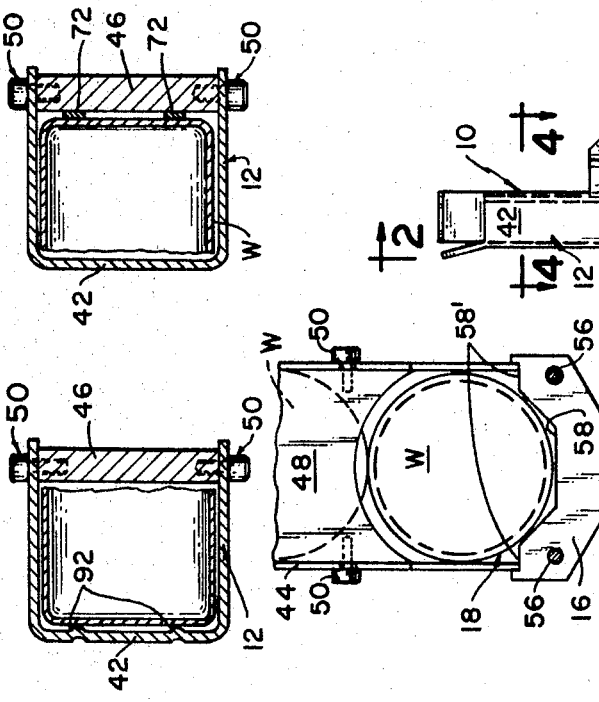

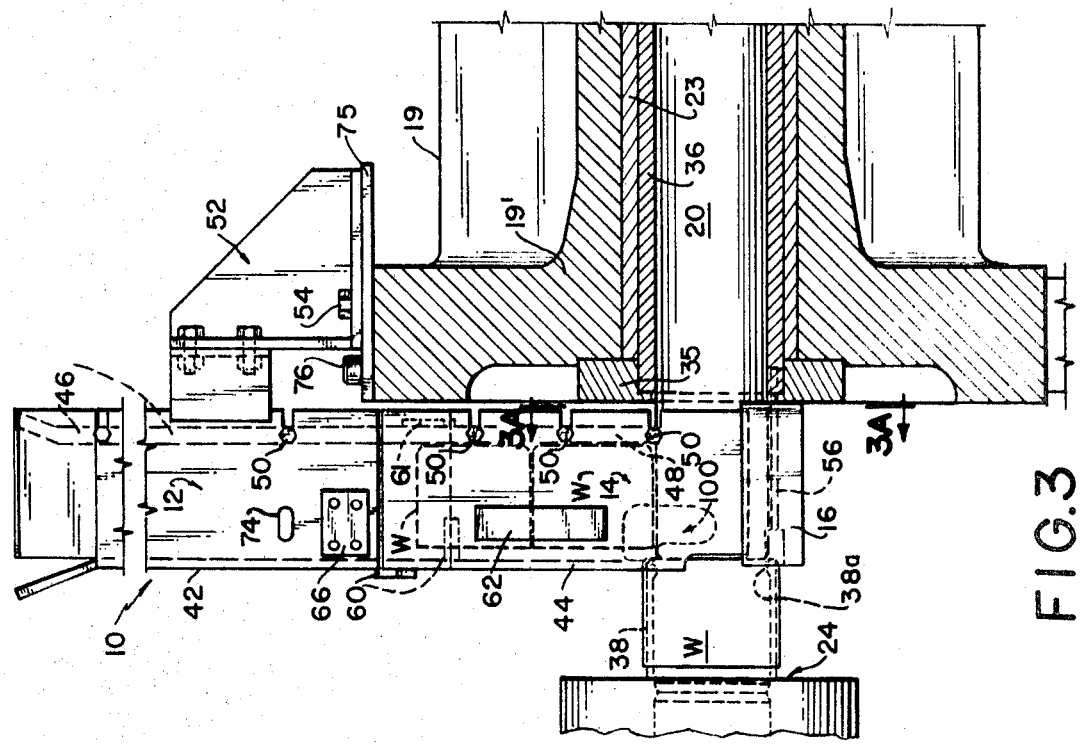

3,469,432
PNEUMATIC FEEDING DEVICE
Arthur Dean Smith, San Lorenzo, and Cornelis Langewis, Walnut Creek, Calif., assignors to Kaiser Aluminum & Chemical Corporation, Oakland, Calif., a corporation of Delaware
Filed July 10, 1967, Ser. No. 652,211
Int. Cl. B21d 22/00
U.S. Cl. 72—361         13 Claims

ABSTRACT OF THE DISCLOSURE

A pneumatic device for successively feeding an endmost workpiece of a plurality of stacked workpieces to a forming apparatus which is generally comprised of a forming ram and a die means spaced from and cooperatively aligned with the ram. The feeding device per se is generally comprised of a closed chute, the discharge end of which is selectively cut away to define a transverse opening alignable with the forward end of the ram and die means. Workpieces deposited in the chute are constantly urged forward under the influence of air toward the discharge end thereof so that during the ram's advancement it can engage the workpiece located at the discharge end of the chute and then pass the same through the die means. As the ram continues its advancement past the chute, a portion of the ram advantageously acts to close off the discharge or exit end of the chute while it slidingly contacts the next succeeding workpiece in the chute.

Background of the invention

This invention relates to a pneumatic feeding device which among other things can be used in the feeding of cup-shaped blanks to a container fabricating machine. More particularly, it relates to an improved pneumatic feeding device for use in feeding cup-shaped blanks to a draw and iron container forming apparatus wherein the pneumatic feeder operates in a unique fashion in conjunction with an arresting device as well as the forming ram to both feed successive blanks to and orient the blanks relative to the dies.

Various apparatus have been designed in the past for placing successive cup-shaped workpieces in position in a draw and iron container fabricating press. Some of the principal deficiencies of these prior art feeder apparatus resided in the fact that the mechanical elements used such as rotating turrets, sliding fingers, etc. required certain lost motions, were susceptible to jamming simply because of the nature of such feeders or could be operated at only limited speeds. Thus, the final production rate of a given piece of equipment provided with such devices was limited due to the limitations of such feeders. The pneumatic feeder of the instant invention is such that it provides for a maximum feed rate while at the same time minimizing jamming and malfunctions in the feeding operation.

Summary of the invention

It is the primary purpose of the instant invention to provide an improved pneumatic feeder for successively feeding a plurality of workpieces disposed in stacked relation to each other to a container forming apparatus such as a draw and iron press device normally provided with a reciprocating ram slidably disposed and aligned with one or more die rings. The pneumatic feeder generally comprises a closed chute wherein air under pressure is directed against the stacked workpieces for the purpose of forcing one of the workpieces into the proper position and alignment relative both to the end of a forming ram and the dies associated with the ram. As the ram engages the immediate workpiece to be acted on and passes it through the dies the trailing portions of the ram and ram piston rod act to close off the feeder and arrest further depressing of the workpieces.

Brief description of the drawings

In the accompanying drawings:
FIG. 1 is a partial side view of a draw and iron press provided with the pneumatic feeder of the instant invention with various operating positions of the press or body maker being shown in dotted lines and with certain parts removed and other parts being shown in longitudinal section;
FIG. 2 is a view generally taken along line 2—2 of FIG. 1 with certain parts broken away and illustrates details of the pneumatic feeder device of the instant invention;
FIG. 3 is a fragmentary and partially sectional view generally taken along line 3—3 of FIG. 2 and ilustrates certain parts in longitudinal section;
FIG. 3A is a view taken along line 3A—3A of FIG. 3 and illustrates further details of the feeding device;
FIG. 4 is a transverse sectional view of the feeding device taken along line 4—4 of FIG. 1 with parts removed;
FIG. 5 is a partial side view of a modified draw and iron press provided with the pneumatic feeding device of the instant invention; and
FIG. 6 is a transverse sectional view taken along line 6—6 of FIG. 5.

Detailed description

With further reference to the drawings and particularly FIGS. 1–4, a preferred embodiment of the pneumatic feeding device 10 of the instant invention generally comprises a substantially fully enclosed chute made up of upper and lower interconnected walled sections 12 and 14 and a centering block or arresting device 16 disposed across the exit end of the chute. Although chute 10 as shown is disposed in a vertical plane, it is to be understood that it could be disposed where convenient in a horizontal or inclined plane. Opposed wall portions at the exit end of the chute are partially cut away to define an overall transverse opening 18 adjacent the block 16. The feeding device 10 is preferably associated with a container draw and iron forming apparatus 19 provided with a reciprocating ram 20 and a series of spaced and associated die elements 38, 40 and 40 arranged within a tool pack 24. This draw and iron apparatus 19 can, for example, be of the type shown in Langewis Patent 3,314,-274, issued Apr. 18, 1967. The forced air flow for the chute of the feeder 10 is generated by means to be described which is in open communication with the interior of the chute so as to continuously urge the workpieces or cup-shaped blanks deposited in the chute at the upper or entry end thereof toward the lower or exit end thereof in adjacent or stacked relation to each other such that the end or bottom-most workpiece W will be forced to seat itself against the block 16.

Upon transfer of this end-most workpiece to the die elements by advancement of the ram 20 through the opening 18 in the chute, movement of the remaining stack of workpieces W forward in the chute is temporarily arrested by virtue of the sliding contact between the next workpiece and the trailing portions of the advancing ram 20 and the piston rod 22 to which it is attached. Thus, the ram and actuating piston rod 22 therefor during advancement of the ram all act as effective closures for the chute during portions of the forward and backward stroking of the ram. It is to be understood that the feeding device 10 of the instant invention is capable of being used with any appropriate type of workpiece W and in this instance the workpieces W have been previously formed into shallow cup shapes from a length of sheet stock such as aluminum or aluminum alloy in a conventional manner not shown.

The apparatus 19, as indicated in FIG. 1 and as indicated in the aforementioned patent, can include a fluid actuator 28 at one end for timely advancing the ram through the tool pack 24 at the other end. This fluid actuator 28 involves a crank operated driving piston 30, only part of which is shown, for actuating the fluid 32 confined within a chamber for the actuator 28 and disposed in direct communication with the piston 34 attached to the inner end of the ram so as to act as a fluid coupling between pistons 30 and 34. The ram 20 is disposed for slidable movement within the bore 22' defined by the cylindrical sleeve 23, which extends substantially the full length of the barrel 19' of the apparatus 19. The forming end of the ram 20 can be slidably disposed within a bearing and guide sleeve 36 affixed in a conventional manner to the forward end of the sleeve 23. The forward end of the sleeve 36 extending beyond the forward flanged end of the barrel 19' of the apparatus 19 is closed off by an apertured closure member 35 attached to the outer face of the forward flanged end of the barrel 19' by the Allen head cap screw assemblies generally indicated at 21 in FIG. 2.

As indicated in FIG. 1 and in the aforesaid Patent 3,314,274, the die means 24 can be advantageously made up of a reverse redraw die 38 and a series of ironing dies 40 together with an appropriate stripper mechanism S disposed adjacent the last ironing die 40 in the overall die means or tool pack 24.

As indicated particularly in FIGS. 4 and 6, both chute sections 12 and 14 of the device 10 are made up of corresponding U-shaped plates 42 and 44 and the free ends of the opposed and spaced wall portions of each plate are closed off by their respective backing plates 46 and 48 so as to form a fully enclosed chute. The backing plates 46 and 48 are adjustably affixed to the free ends of the spaced wall portions of their associated plates 42 and 44 by the customary U-shaped slots and cap screw assemblies 50. The upper chute section 12 is affixed to the apparatus framework by an appropriate bracket assembly 52. This assembly 52 is affixed to the free ends of the spaced wall portions of the U-shaped plate 42 at a point intermediate the longitudinal ends of the plate 42 such that the lower flanged end of the bracket assembly 52 can be affixed to an upper flat section of the flanged end of the barrel 19' of the framework of apparatus 19 by the cap screw assemblies 54 (only one of which is shown).

The upper open end of the U-shaped plate 42 of upper chute section 12 includes outwardly flared end portions to facilitate depositing of successive workpieces W into the chute. Although not shown, it is to be understood that an appropriate device such as a hopper or conveyor mechanism can be used for supplying the workpieces into the flared end of the chute in a substantially continuous fashion whereby each cup-shaped workpiece upon being deposited in the upper end of the chute is properly oriented so as to present its open end to the intermediate and interconnecting wall portion 46 of the U-shaped plate 42 of the upper chute section 12 in the fashion shown in FIGURE 4.

The lower chute section 14 at the lower end thereof is seated against the centering block 16 while its upper end is connected to the lower end of the upper chute section 12. To this end, the centering block 16 is affixed in a known manner to the apertured closure member 35 by Allen head screw assemblies 56. Block 16 is provided with an upwardly facing generally V-shaped shallow recess 58. The lower end of the lower chute section 14 is disposed in nesting or seating engagement with the laterally spaced intersecting wall portions 58' that define the upper stepped end of the V-shaped recess 58 of the block 16. The overall transverse opening 18 adjacent the block 16 at the lower end of the lower chute section 14 is formed by partially cutting away sections of the web of member 42 and back plate 48 in the fashion indicated in FIG. 3A. The interconnecting upper and lower ends of the chute sections 12 and 14 are correspondingly beveled in order that the aligned and correspondingly beveled ends of the U-shaped plates 42 and 44 and the backing plates 46 and 48 can be placed in full abutting engagement, when the lower end of the lower chute section is in nesting engagement with the affixed block 16 as aforedescribed. To assist the aligned interconnection of the corresponding beveled ends of the chute sections 12 and 14, a series of lugs 60 are affixed in spaced relation to each other on intersecting wall portions of the U-shaped plate 42 of the upper chute section 12 at the beveled end thereof so as to partially extend beyound the beveled end of the upper chute section in the fashion illustrated in FIG. 3. A further lug 61 is affixed in a similar manner to the lower end of the backing plate 46 of the upper chute section 12 and is shown by the dotted lines in FIGS. 2–3. Thus, one lug 60 along with lug 61 can advantageously act as a guide for interconnecting the chute sections 12 and 14 together while the other lug 60 affixed to the sidewall portion of the plate 44 acts as a stop and assures proper alignment of the interconnected chute sections. It is to be observed here, in order to facilitate the nesting engagement of the lower end of the lower chute section 14 with the block 16 and the interconnection of the chute sections 12 and 14 together at their beveled ends, that a handle 62 can be attached to one of the side wall portions of the U-shaped plate 44 of the lower chute section 14, all as indicated in FIGS. 2–3.

The interconnected chute sections 12 and 14 can be securely locked in position by a suitable locking device 64 such as one manufactured and sold by the Detroit Stamping Co. of Detroit, Mich., under Model No. 102–T. This device 64 includes a bracket 65 having a flanged base portion 65' which is affixedly mounted on a raised pad 66 preferably disposed at the lower end of the side wall portion of the U-shaped plate 42 of the upper chute section 12 on the same side as the handle 62. A toggle linkage assembly 68 comprised of three interconnected links is pivotally interconnected to the outer end of the bracket 65. One link 67 at its outer end adjustably mounts a locking pin 70 while its inner end is pivotally connected to the bracket 65. A second link 69 at its outer end has been advantageously modified to include an arcuately shaped workpiece arresting element 72' affixed thereto while its inner end is pivotally connected to the bracket 65 at a point spaced below and inwardly of the pivotal connection of the link 67 to the bracket 65. This arresting element 72' can be swung into position where needed through a suitable aperture 74 on the chute section 12. A third and final link of relatively shorter length than the first two links 67 and 69 is pivotally interconnected at one end to link 69 as indicated at 69a as well as pivotally interconnected at the other end to link 67 as indicated at 67a. It is to be understood that the three links making up the linkage assembly 68 are proportionally arranged relative to each other such that when the assembly 68 is in the solid line position shown in FIG. 2, it is in the snap-lock position whereby the head end of the pin 70 abutingly engages the lower chute section for lockingly securing the interconnected chute sections 12 and 14 together. When the linkage assembly 68 is pivoted upwardly or counterclockwise in FIG. 2, the plunger 70 is released from abutting engagement with the lower chute section 14 and upon full counterclockwise movement of the linkage assembly 68, from the solid line position illustrated in FIG. 2, the arresting arm 72' will pass through the aperture 74 in the upper chute section 12 for temporarily arresting the stacked workpieces thereabove as manifested by the dotted lines in FIG. 2. Temporary arrestment of the stacked workpieces W in the upper chute section 12 normally occurs when it is desired to remove the lower chute section 12 for servicing the feed device 10.

As further indicated in FIG. 4, the depth and dimetrical size of the cup-shaped workpiece W is such that it is somewhat smaller than the internal dimensions of the chute sections 12 and 14 whereby the workpieces deposited in the outer end of the chute of the device can freely travel in stacked relation to the bottom or exit end of the chute. In order to minimize frictional engagement between the workpiece W and the inside surfaces of the chute sections 12 and 14 and assure the free fall of the workpieces W through the chute, parallel spaced ribs 72 are provided on the inside suface of the adjustable back plates 46 and 48. Furthermore, the diametrical extent of the transverse opening 18 at the lower end of the lower chute section is somewhat larger than the diametrical size of the workpiece, so as to assure free transfer of the bottom-most workpiece at any given time through the opening 18 and onto the nose portion 38a of the reverse redraw die 38 upon advancement of the forming ram 20 along with the workpiece through tool pack 24.

In order to continuously and forcefully urge successive workpieces W toward the exit end of the chute 10 and thereby ensure proper feeding of workpieces W to a ram 20 and its die elements, air under pressure is introduced between the entry and exit ends of the device 10 and exhausted from the ends thereof by means of a fan device 73 attached to a mounting plate 75. One end portion of plate 75 is interposed between the lower flanged end of the aforementioned bracket assembly 52 and the flanged end of the barrel 19' of the framework of the draw and iron apparatus 19.

The mounting plate 75 can be additionally affixed to the barrel 19' of apparatus 19 by cap screw assemblies 76 (only one of which is shown). Mounting plate 74 can be reinforced by the vertical plate 78 dependingly affixed thereto as well as to the barrel 19' by cap screw assembly 79. The tangential outlet 80 of the rotary fan 73 is communicated with a manifold 82 on one side of the upper chute 12 by way of a flexible conduit 84 of appropriate material. Manifold 82 is made up of a series of assembled plates affixed to the side wall portion of the upper chute section on the side thereof opposite the side to which the locking device 64 aforedescribed is attached. The lower end of the manifold 82 is viewed in FIGURE 2 is disposed immediately above the upper edge of the affixed lug 60. The manifold 82 by being affixed to the upper chute 12 is adapted to communicate with at least one opening 85 (indicated by dotted lines) provided in the side wall portion of the U-shaped plate 42 and leading to the interior of chute 12. Thus, upon energization of the motor (not shown) for rotating the fan 73, a forced air flow is directed out of its tangential outlet 80 and then passed through opening 85 and into chute 10.

It is to be observed here that the number of workpieces W stacked above the opening 85 will be such that the overall aggregative load or weight of the same will be sufficient to counteract the force of the air passing through the upper end of the chute whereby, during operation of the device 10, workpieces located above opening 85 will not be accidentally blown out through the upper end of the chute. Thus, the hopper mechanism or the like used to deposit the workpieces into the upper end of the chute should have sufficient capacity to deposit enough workpieces not only to keep up with the cylical demand of the forming apparatus but also to maintain a sufficient number of stacked workpieces above the opening 85 to counteract when aided by gravity the force of the exhausting air flow. It has been found that air introduced on the order of $\frac{1}{25}$ p.s.i. is sufficient to properly act in a downward direction for feeding purposes.

In a modified form of the invention a vacuum type of device can be used in lieu of the forced air feed of FIG. 1. Thus, as indicated by dotted lines in FIG. 2, a conduit 86 is connected at one end to an appropriate opening provided in the block 16 and at the other end has series connected thereto a filter 88 and a vacuum generating source 90. The filter 88 serves the purpose to separate oil and other debris from the air flow exhausted from the inner end of the chute so as not to hinder the efficient operation of the vacuum generating source 90. Thus, the vacuum generating source 90 can also effectively seat the bottom-most workpiece W against the centering block 16. In contrast to the forced air flow introduced at opening 85 between the ends of the chute, the vacuum source 90 in being connected to the inner end of the chute does not tend to forcefully eject the stacked workpieces from the outer end of the chute.

The opposed side walls of the U-shaped plate 44 at the inner end of the lower chute section 12, the centering block 16 and the next-to-the-bottom-most workpiece of the stacked workpieces all cooperate together in conjunction with the influence of the forced air flow exhausted through the lower end of the lower chute section 14 to hold side wall portions of the bottom-most workpiece W in positive seating engagement against the spaced beveled portions 58a of the block 16 whereby each bottom-most workpiece will automatically center itself relative to the forming end of the ram 20. As is evident in FIG. 3, the nose portion of the reverse redraw die 38 projects partly into the opening 18 while at the same time adequately clearing the opened end of the bottom-most workpiece W. Upon advancement of the ram 20, the forming end thereof abuttingly engages the bottom of the bottom-most workpiece W, removes it from the ledge or centering block 16 and then passes it through the tool pack 24. At the same time, the trailing portions of ram 20 and piston rod 22 act to close off the bottom of the chute 10 and prevent further discharge of workpieces onto the ledge 16 until such time as the ram 20 is retracted into the sleeve 36 on its return stroke. As the ram retracts into the sleeve 36 opening chute 10, the next adjacent workpiece is deposited upon the ledge 16 for engagement with the ram on its next forward stroke. When it is realized that the ram 20 is stroking at high speed such as 120 to 140 strokes a minute and a workpiece W has to be deposited quickly and accurately on ledge 16 in the fraction of a second that the bottom of chute 10 is clear of ram 20, the advantageous use of air either to push or pull the workpiece into the seat 16 will be readily appreciated.

Another advantageous embodiment of the invention is illustrated in the feeder 10' of FIGS. 5–6. In this instance longitudinally spaced ribs 92 are formed in the intermediate or interconnecting wall portions of the U-shaped plates 42 and 44 so as to minimize frictional engagement of the workpieces W therewith. The tool pack 24' in this instance may include a straight redraw die 38' at the entry end thereof in lieu of the reverse redraw die 38 illustrated at the entry end of the tool pack 24 in FIGS. 1–3.

The open end of the bottom-most workpiece W in the device 10' is slid directly over the forming end of the ram 20 upon the advancement thereof until the bottom of the workpiece W abuttingly engages the forward end of the ram. The straight redraw die 38' at the entry end of the tool pack 24' is closely spaced from the lower end of the device 10' and thus prevents misalignment of the bottom-most workpiece W during transfer onto the ram 20 upon the advancement thereof. As with the aforedescribed device 10, the next-to-the-bottom-most workpiece W is temporarily arrested from advancing into the bottom-most position at the inner end of thec hute by slidably engaging the trailing portion of the ram 20 and piston rod 22 until after full retraction of the ram 20 on its backward stroke.

In those instances when ram 20 is idling, a workpiece arresting device such as pin 94 can be used to stop workpiece feeding. Pin 94 is attached to the rod end of a fluid actuator 96 mounted upon the centering block 16 by an interconnecting plate-and-cap-screw assembly 98. The arresting pin 94 is aligned with a closed end slot 100 at the lower end of one of the side wall portions of the U-shaped plate 44 of the lower chute section 14; and in its retracted position pin 94 is disposed outside of this slot 100. Upon actuation of the actuator 96, the pin 94 engages and arrests the next-to-the-bottom-most workpiece W within the chute 10 or 10' whereby the ram can idle without disturbing the stacked workpieces remaining in chute 10 or 10'. It is to be understood that the fluid actuator 96 can be interconnected with an electrical control circuit (not shown) provided with an interlock that prevents actuation of the actuator 96 until after the forward end of the ram 20 is extended beyond the lower end of the chute 10 or 10', as the case may be, into a tool pack 24 or 24' so as to prevent improper actuation of pin 94 and arrestment of the next-to-the-bottom-most workpiece W within the chute 10 or 10'.

From the foregoing description it will be seen that one of the significant advantages of the feeder device of the instant invention is that the workpieces can be rapidly, and accurately fed to the ram and dies in an extremely efficient and relatively foolproof fashion.

Advantageous embodiments of the instant invention have been disclosed and described. It is obvious that various changes and modifications may be made therein without departing from the spirit and scope thereof as defined by the following appended claims, wherein:

What is claimed is:

1. In combination with a press apparatus provided with a die means and a reciprocating forming ram or the like, a device for feeding a plurality of workpieces in a successive fashion to said press apparatus, said feeding device comprising a substantially closed chute for receiving the workpieces at one end thereof and for discharging the workpieces at another end thereof, the die means of the press apparatus being disposed adjacent the discharge end of the chute, fixed means located intermediate the said die means and the discharge end of the chute for receiving and orienting successive workpieces relative to said die means, means for generating a substantially continuous flow of fluid in said chute and in a direction toward said fixed means for urging the workpieces toward and for effecting the proper disposition of each workpiece on said fixed receiving and orienting means, and said ram of said press apparatus being aligned with said die means and oriented relative to said fixed receiving and orienting means whereby said ram can remove the successive workpieces progressively disposed on said fixed receiving and orienting means and then pass said workpieces through said die means in one uninterrupted forward stroke of the ram.

2. The combination as set forth in claim 1, wherein the discharge end of the chute is cut away so as to receive the ram.

3. The combination as set forth in claim 1 including arresting means mounted in said chute for engaging one of the workpieces and for preventing the further movement thereof through the chute irrespective of the action of fluid thereagainst.

4. The combination as set forth in claim 1 including means for stroking the ram far enough on its forward stroke to enable the ram to pass completely through the discharge end of the chute whereby as the ram passes through the chute it also acts to close off the discharge end thereof and temporarily arrests further movement of the workpieces therethrough.

5. The combination as set forth in claim 1 wherein the walls of the chute are provided with means for minimizing frictional engagement between the workpieces and chute.

6. The combination as set forth in claim 5 in which said last mentioned means comprises raised ribs on the walls of the chute.

7. The combination as set forth in claim 1 wherein said fluid flow generating means comprises a source of air under pressure and means for introducing said air under pressure into said chute.

8. The combination as set forth in claim 1 wherein said fluid flow generating means comprises means for drawing a vacuum on the workpiece located most closely adjacent said fixed centering and orienting means.

9. In combination with a press apparatus provided with a die means and a reciprocating forming ram, a device for feeding a plurality of cup-shaped workpieces in a successive fashion to said press apparatus, said device comprising a substantially closed chute for receiving the cup-shaped workpieces at one end portion thereof orienting said workpieces in a stacked relationship and for discharging the workpieces at another end portion thereof, the die means of said apparatus being disposed adjacent the discharge end portion of said chute, a fixed combination ledge and centering element located intermediate said die means and the discharge end portion of said chute for receiving and orienting successive workpieces relative to said die means, means for generating a substantially continuous flow of fluid in said chute for urging the workpieces in a direction toward said fixed ledge and centering element and for effecting the proper disposition of each workpiece on said fixed ledge and centering element and the ram of said press apparatus being aligned with said fixed ledge and centering element and die means, said ram acting to successively remove workpieces progressively disposed on said fixed ledge and centering element and then to pass said workpieces through the die means in one uninterrupted forward stroke of said ram.

10. The combination as set forth in claim 9 in which said die means at the entry end thereof includes a straight draw die.

11. The combination as set forth in claim 9 in which said die means at the entry end thereof includes a reverse redraw die.

12. The combination as set forth in claim 9 wherein said fluid flow generating means includes means for introducing air into said chute under pressure.

13. The combination as set forth in claim 9 wherein said fluid flow generating means comprises means for drawing a vacuum on the workpiece located most closely adjacent said fixed ledge and centering element.

References Cited

UNITED STATES PATENTS

| | | | |
|---|---|---|---|
| 1,198,250 | 9/1916 | Malo | 72—361 |
| 1,505,814 | 8/1924 | Smith | 72—361 |
| 1,546,091 | 7/1925 | Lewis | 113—121 |
| 3,217,397 | 11/1965 | Voss | 113—121 |
| 3,312,097 | 4/1967 | Henrickson et al. | 72—347 |

RICHARD J. HERBST, Primary Examiner